Sept. 19, 1967  G. I. THOMAS  3,342,508
AUXILIARY UNIVERSAL TOW-BAR FOR BOAT TRAILERS
Filed Jan. 13, 1966  2 Sheets-Sheet 2

INVENTOR
GERALD I. THOMAS

BY *Wynne and Finken*

ATTORNEYS.

United States Patent Office 3,342,508
Patented Sept. 19, 1967

3,342,508
AUXILIARY UNIVERSAL TOW-BAR FOR
BOAT TRAILERS
Gerald I. Thomas, Panama City, Fla., assignor, by mesne assignments, of one-half to Small Business Assistance Corporation of Panama City, Panama City, Fla., a corporation of Florida, and one-half to D. H. Morris III, and John H. Harris, Jr., both of Geneva, Ala.
Filed Jan. 13, 1966, Ser. No. 520,418
10 Claims. (Cl. 280—414)

This invention relates to towed vehicles and particularly to improvements in boat trailers facilitating the loading and unloading of a boat onto and from the trailer.

The principal object of this invention is provide an improved trailer which enables the trailer to pivot at its drawbar attachment means and to tilt at its attachment means for facilitating the loading of a boat thereon.

A further object is to provide a kit or attachment for converting any conventional boat trailer to one having the aforesaid pivoting and tilting universal movement in addition to trailers having said improvements built in.

Other objects and advantages will be apparent to those skilled in the art from the description herein.

The prior art, as exemplified by U.S. Patents 2,765,180, 2,937,776, 3,058,608 and 3,127,042, has suggested boat trailers which have pivoting and tilting movement to facilitate loading. However, the prior art constructions are relatively complex and are not readily adaptable for converting existing conventional trailers without substantial reconstruction thereof. The prior art trailers also utilize pivoting and tilting boat-carrying beds as opposed to the construction of this invention, in which the entire trailer structure, apart from the draw bar means, pivots and tilts to facilitate loading. The pivoting bed arrangement also generally affords limited pivotal movement and is not satisfactory for heavy boats.

Referring to the drawings.

Figure 1:
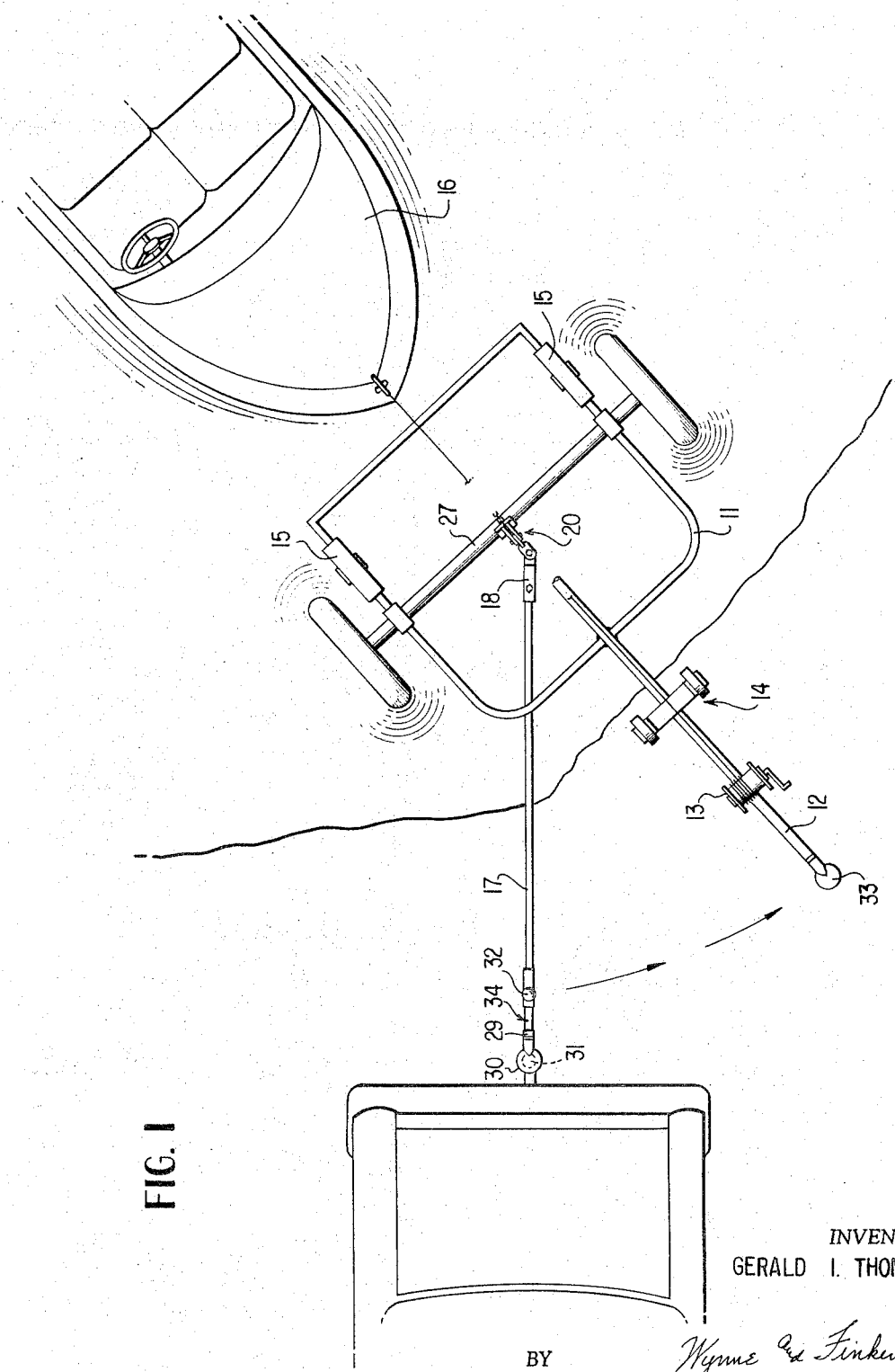
FIG. 1 is a top plan view, partly schematic and partly in section, showing the loading of a boat on the trailer of this invention.
Figure 2:
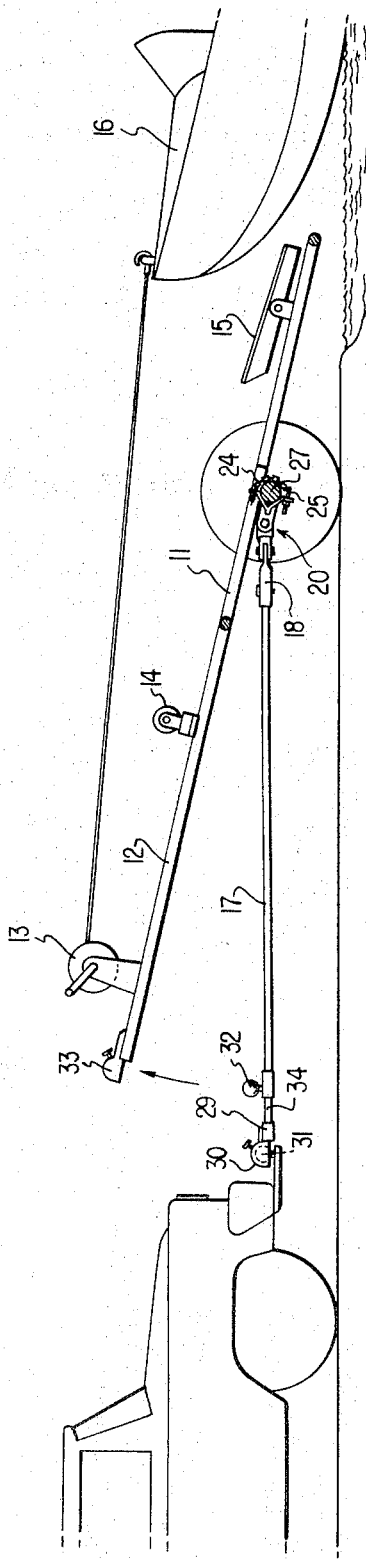
FIG. 2 is a view in elevation, partly schematic, showing the loading of a boat on the trailer of this invention.

In FIGS. 1 and 2, a trailer is indicated at 11, provided with a drawbar or tongue 12 rigidly connected to the trailer frame as is known in the art. The trailer is preferably equipped with winch means 13, supporting rollers 14 and skids 15 as is conventional in the art, for drawing up and supporting a boat 16. An auxiliary drawbar or tongue 17 is fastened at its rear end to the trailer frame or axle to permit universal pivotal movement in both horizontal and vertical planes between the auxiliary drawbar 17 and the trailer frame 11.

Figure 3:
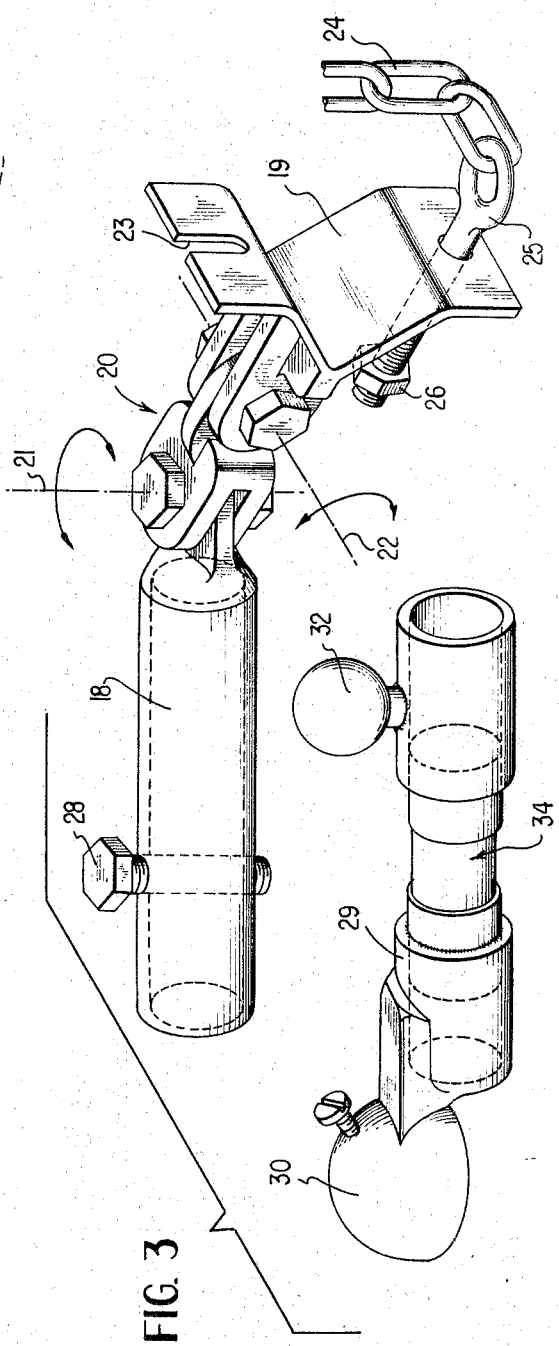
FIG. 3 is a perspective view, with some parts broken away, of an unassembled kit of parts according to the invention which enables the conversion of a conventional boat trailer to the improved trailer of the invention.

The details of the universal connection and attachment means for the rear end of the auxiliary drawbar 17 are apparent from FIG. 3. Sleeve member 18 is connected to an attachment clamp 19 by a universal connection indicated at 20, which permits pivotal movement in a horizontal plane about the vertical axis 21 and tilting movement in a vertical plane about the horizontal axis 22. The attachment means comprises a clamping member 19 having a slot 23 for receiving a link of chain member 24 which is attached to threaded eye-bolt 25 extending through a hole in the clamping member 19. The clamping member is placed against the axle or frame member of the trailer, a link of the chain 24 secured in slot 23 and the nut 26 tightened to clamp the trailer part thereby. In FIG. 2, the clamp is shown in place about the trailer axle 27 but it is apparent that it may be connected to any rigid frame part extending transversely of the longitudinal axis of the trailer.

Sleeve 18 is slipped over the end of auxiliary drawbar 17, which may be a length of pipe, and is provided with means for securing the same together, shown in FIGS. 2 and 3 as a bolt 28 which passes through the sleeve and a mating hole in the drawbar 17, although any suitable securing means may be employed.

A second sleeve 29 is secured to the forward end of auxiliary drawbar 17. Sleeve 29 has hitch means 30 secured thereto for attachment to cooperating hitch means 31 mounted on the towing vehicle. Sleeve 29 also carries a cooperating hitch means 32 for attachment to the hitch means 33 mounted on the end of drawbar 12. The respective hitching means are shown as conventional ball and socket hitches although any suitable towing hitch may be employed. Sleeve 29 may be secured to auxiliary drawbar 17 by any suitable means, such as by mating screw threads on the respective parts, not shown.

In a preferred embodiment, as shown in FIG. 3, sleeve 29 is divided intermediate its length and the respective parts thereof connected by shock absorbing means shown schematically at 34. Any conventional shock absorber, hydraulic, pneumatic or spring type, such as are used on motor vehicles, may be employed, the purpose being to minimize shocks to the towing vehicle during transit.

The advantages of the pivoting action of the trailer are apparent from FIG. 1, where wind or wave action have moved the boat out of line with the towing vehicle. Thus the entire trailer body, except for auxiliary drawbar 17 may be swung into alignment with the boat while retaining connection with the towing vehicle. FIG. 2 illustrates the advantage of the tilting action of the trailer in facilitating loading of the boat while retaining connection with the towing vehicle.

The improvements of the invention may be built into boat trailers or may be applied to convert any conventional boat trailer to the improved tilting and pivoting trailer of the invention. The conversion kit for the latter consists of the two assemblies shown in FIG. 3. The purchaser merely purchases in addition a length of pipe or the like to serve as auxiliary drawbar 17, cut to the proper length to fit an existing trailer, and assembles them in the manner described above. The kit can also include the drawbar 17 of proper length to fit trailers of standard make. It is apparent that such conversion kits will be suitable with two-wheeled boat trailers of any design. It will be understood that the basic trailer assembly shown in FIGS. 1 and 2 is schematic only, as most such trailers are equipped with spring and/or shock absorber supported beds to minimize road shock. It is also apparent that a variety of connection means, universal joints and the like may be utilized in the invention with equivalent results.

While the invention has been described and illusrtated in terms of certain embodiments, they are to be considered illustrative rather than limiting, and it is intended to cover all modifications that fall within the spirit and scope of the appended claims.

I claim:

1. A boat trailer, comprising in combination a trailer frame, wheeled axle means attached to said frame, a first drawbar rigidly attached to said frame, hitch means on the free end of said first drawbar, a second drawbar of longer length than said first drawbar, means attaching the rear end of said second drawbar to the trailer frame adjacent said axle means, universal connection means intermediate said attachment means and said rear end of the drawbar permitting pivotal movement in both horizontal and vertical planes between said trailer frame and said second drawbar, hitch means on the forward end of said second drawbar for attachment to a towing vehicle, and cooperating hitch means on and intermediate the ends of said second drawbar for attachment to the hitch means on the end of said first drawbar.

2. The trailer set forth in claim 1 wherein said attachment means comprises a clamp clamped about the trailer frame part.

3. The trailer set forth in claim 1 including shock absorber means mounted between the hitch means on the forward end, the second drawbar and the cooperating hitch means intermediate the ends of said second drawbar.

4. An attachment for use in combination with a boat trailer having a trailer frame, a drawbar and hitch means on the free end of said drawbar for attaching the trailer to a towing vehicle, said attachment comprising an auxiliary drawbar of longer length than said trailer drawbar, means for attaching the rear end of said auxiliary drawbar to the trailer frame, universal connection means intermediate the rear end of said auxiliary drawbar and said attachment means permitting pivotal movement in both horizontal and vertical planes between said trailer frame and said auxiliary drawbar, hitch means on the forward end of said auxiliary drawbar for attachment to a towing vehicle, and cooperating hitch means on and intermediate the ends of said auxiliary drawbar for attachment to the hitch means of said trailer drawbar.

5. The attchment set forth in claim 4 wherein said attachment means for the rear end of said auxiliary drawbar comprises a clamp for clamping about a trailer frame part.

6. The attachment set forth in claim 4 including shock absorber means mounted between the hitch means on the forward end of the auxiliary drawbar and the cooperating hitch means mounted thereon.

7. An attachment kit for use in combination with a boat trailer having a trailer frame, a drawbar and hitch means on the free end of said drawbar for attaching the trailer to a towing vehicle, said attachment kit comprising two sleeves. the first said sleeve having means at one end thereof for attachment to one end of an auxiliary drawbar, attachment means at the other end of said sleeve for attachment to the trailer frame and universal connection means intermediate said other end of the sleeve and said attachment means for permitting pivotal movement in both horizontal and vertical planes between said trailer frame and said first sleeve, the second said sleeve having means at one end thereof for attachment to the other end of an auxiliary drawbar, hitch means on the other end of said sleeve for attachment to a towing vehicle and cooperating hitch means intermediate the ends of said sleeve for attachment to the hitch means on the trailer drawbar.

8. The kit set forth in claim 7 wherein the attachment means at the other end of said first sleeve comprises clamp for clamping about a trailer frame part.

9. The kit set forth in claim 7 wherein said second sleeve is divided between the hitch means on one end thereof and the cooperating hitch means thereon, said divided sleeve parts being connected by shock absorber means.

10. A kit for forming an auxiliary universal connection between a towing vehicle and a towed trailer having a trailer frame, a drawbar and means for connecting the trailer drawbar to a vehicle; comprising two separate end members, the first said end member having means for connection to the trailer frame including universally pivoted means said second end member having means for connection to a vehicle, each said end members having means for connection to an auxiliary drawbar, whereby upon connection of all aforesaid connection means said tralier universally connected to said vehicle, and means for connecting the auxiliary drawbar to said trailer drawbar.

References Cited

UNITED STATES PATENTS

| 1,435,063 | 11/1922 | Holmes | 280—494 X |
| 1,537,249 | 5/1925 | Manley | 280—493 |
| 2,440,877 | 5/1948 | Russell | 280—494 X |
| 2,765,180 | 10/1956 | Albers | 280—414 |
| 2,823,817 | 2/1958 | Holsclaw | 280—414 X |
| 2,937,776 | 5/1960 | Beckham | 214—505 |
| 3,058,608 | 10/1962 | Lewis | 214—505 |
| 3,127,042 | 3/1964 | Beckham | 214—505 |

LEO FRIAGLIA, *Primary Examiner.*